United States Patent [19]

Mason

[11] Patent Number: 5,387,350

[45] Date of Patent: * Feb. 7, 1995

[54] METHOD AND APPARATUS FOR TREATING AND DISINFECTING INFECTIOUS WASTES

[75] Inventor: James A. Mason, Theodore, Ala.

[73] Assignee: George L. Williamson, Daphne, Ala.

[*] Notice: The portion of the term of this patent subsequent to Dec. 15, 2009 has been disclaimed.

[21] Appl. No.: 106,882

[22] Filed: Aug. 16, 1993

Related U.S. Application Data

[63] Continuation-in-part of Ser. No. 898,509, Jun. 15, 1992, abandoned, which is a continuation-in-part of Ser. No. 876,292, Apr. 30, 1992, abandoned, which is a continuation-in-part of Ser. No. 763,185, Sep. 20, 1991, Pat. No. 5,122,282, which is a continuation-in-part of Ser. No. 579,167, Sep. 7, 1990, abandoned, which is a continuation-in-part of Ser. No. 438,847, Nov. 20, 1989, abandoned.

[51] Int. Cl.$^6$ ............................................. C02F 1/76
[52] U.S. Cl. ................................. 210/754; 210/173; 210/206; 210/764; 422/32; 422/33; 422/37; 422/242; 422/295
[58] Field of Search ............ 210/754, 764, 198.1, 210/205, 206, 199, 755, 756, 173; 422/28, 32, 37, 242, 295, 33

[56] References Cited

U.S. PATENT DOCUMENTS

| | | | |
|---|---|---|---|
| 3,867,509 | 2/1975 | Geiger et al. | 423/224 |
| 4,084,747 | 4/1978 | Alliger | 239/4 |
| 4,801,353 | 1/1989 | Mason | 162/73 |
| 4,968,501 | 11/1990 | Mason | 423/243 |
| 5,047,224 | 9/1991 | Dhooge | 210/763 |
| 5,054,696 | 10/1991 | Mennel et al. | 210/173 |
| 5,122,282 | 6/1992 | Mason | 210/754 |
| 5,171,441 | 12/1992 | Mason | 210/206 |

FOREIGN PATENT DOCUMENTS

959238 12/1974 Canada ....................... 423/477

*Primary Examiner*—Neil McCarthy
*Attorney, Agent, or Firm*—George L. Williamson

[57] ABSTRACT

The present invention describes a novel method and apparatus for treating and/or disinfecting medical wastes wherein the medical wastes may be shredded and the contact vessel may be sealed and may be under greater pressure than atmospheric pressure and may have a detention time of no more than 5 minutes. An organic hydroxy acid or carboxylic acid and an alkali metal or alkaline earth metal chlorite are mixed in the contact vessel. The reaction between the acid and chlorite produces chlorine dioxide which is the active substance used to treat and/or disinfect the medical wastes.

21 Claims, 1 Drawing Sheet

METHOD AND APPARATUS FOR TREATING AND DISINFECTING INFECTIOUS WASTES

DESCRIPTION

BACKGROUND OF THE INVENTION

This Application is a continuation in part of application Ser. No. 07/898,509 filed Jun. 15, 1992, abandoned which is a continuation in part of application Ser. No. 07/876,292 filed Apr. 30, 1992, abandoned, which is a continuation in part of application Ser. No. 07/763,185 filed Sep. 20, 1991, now U.S. Pat. No. 5,122,282, which is a continuation in part of application Ser. No. 07/579,167 filed Sep. 7, 1990, abandoned, which is a continuation in part of application Ser. No. 07/438,847 filed Nov. 20, 1989 abandoned.

This invention generally relates to a method and apparatus for treating and disinfecting infectious and/or medical wastes by using various chlorine containing compounds, e.g., chlorine dioxide, and/or chlorine.

Methods and/or apparatuses for treating water and/or wastewater with chlorine dioxide produced from mixing organic acids and chlorites have been described in the prior art. Callerame, in Canadian Patent No. 959,238, described a method and apparatus for producing chlorine dioxide in water. Tice, et al., in U.S. Pat. No. 4,585,482, described a long-acting biocidal composition produced from a chlorine dioxide-liberating compound and an organic acid. Key, et al., in U.S. Pat. No. 4,310,425, described a system of producing chlorine dioxide for use as an anti-bacterial agent in oil field drilling fluid. Wentworth, in U.S. Pat. No. 3,082,146, described a method for the treatment of water using a residual chlorous acid concentration by mixing therewith sodium chlorite and a peroxygen compound. Alliger, in U.S. Pat. No. 4,084,747, described a germ-killing composition produced by contacting lactic acid with sodium chlorite in an aqueous media. Alcide Corporation, in International Application No. PCT/US 85/00470, described a process for disinfecting a substrate comprising contacting the substrate with a composition comprising a chlorine-dioxide liberating compound, such as sodium chlorite, with sufficient organic acid to lower the pH of the composition to less than about 7.

Mason, in U.S. Pat. No. 4,968,501, described a novel method of using chlorous acid to remove sulfur dioxide from exhaust combustion gases. Mason, in U.S. Pat. No. 4,801,353, described a method of bleaching wood pulp using an aqueous solution containing a salt of lactic acid and chlorous acid.

Mason, in U.S. Pat. No. 4,925,645, described a process for producing a mixture containing chlorine dioxide which comprised several steps. Mason, in U.S. Pat. No. 4,892,148, described a process of oil recovery including the steps of injecting flooding water into oil bearing subterranean formations which waters contained a mixture of a salt of lactic acid and chlorous acid. Mason, in U.S. Pat. Nos. 5,122,282 and 5,171,441 described a method and apparatus for treating water and/or wastewater using aqueous solutions prepared from the reaction of an organic hydroxy acid or a carboxylic acid with a chlorite of an alkali metal or alkaline earth metal.

SUMMARY OF THE INVENTION

According to the invention there is provided a method of forming chlorine dioxide in an aqueous solution from the reaction of an organic hydroxy acid or carboxylic acid with a chlorite of an alkali metal or alkaline earth metal to yield a salt of the organic acid and chlorous acid. The reaction is carried out at a pH less than about 7 and at a temperature of less than about 120 degrees F. (48.9 degrees C.), generally in the range of approximately, 60 degrees F. (15.6 degrees C.) to 80 degrees F. (26.7 degrees C.) most preferably at about 62 degrees F. (16.7 degrees C.).

The aforementioned reaction initiates a chain of reactions leading to the production of chlorine dioxide which is believed to be a central chemical agent of the present invention which makes it effective for the treatment and disinfection of infectious and medical wastes. These further reactions, generally, involve the oxidation of various organic compounds or destruction of pathogens, e.g., bacteria and viruses, by either chlorous acid, chloric acid, chlorine dioxide or chlorine gas and will be further described by use of chemical equations in a following section of this specification.

Note that it may be feasible to substitute other alkali metal or alkaline earth metal chlorites in either liquid or solid form as a source of the chlorite referred to in this specification.

The aqueous solutions containing the chlorine compounds which comprise the disinfectant are then injected, mixed with or contacted with the infectious or medical wastes in some type of container, conduit, pipe, chamber, vessel or other enclosed space or cavity so that the chlorine compounds become thoroughly mixed with the infectious or medical wastes for sufficient time so that treatment and disinfection of the medical wastes occurs. Generally, it is expected that the infectious or medical wastes will be associated with, suspended in, or carried by some type of liquid such as water or by conveyance means such as a conveyor belt in the processes where the medical wastes is exposed to or treated by the disinfectants such as chlorine dioxide. However, note that the infectious wastes may be contacted with or mixed with the disinfectants by the batch, dump or bucket load by either hand loading or machine loading the infectious wastes.

It may be possible to use chlorine, chlorine gas, ozone, hydrogen peroxide and/or chlorine dioxide made by any method and other disinfectants in conjunction with the present invention.

A key element of the present invention concerns the construction and operation of the container, chamber or vessel wherein the chlorine compounds, i.e., the disinfectants, are contacted with the infectious or medical wastes. According to the prevent invention, the chamber or other enclosed space may be constructed and operated so that it provides an airtight or sealed chamber for a period of time effective or sufficient for the treatment and disinfection to occur. Furthermore, the chamber may be constructed and operated so that the surface of the water containing the medical wastes contained therein is under atmospheric pressure or a pressure greater than atmospheric pressure. It is believed that having the chamber be airtight or under a pressure greater than atmospheric is partially responsible for the unexpectedly rapid and high levels of treatment and/or disinfection resulting from the present invention, probably due to the fact that the individual molecules of the chlorine, chlorine dioxide and/or chlorine containing compounds are prevented and/or minimized from escaping from the water and/or medical wastes, and held in close contact with the individual molecules of the water containing the medical wastes and likewise the individual molecules of medical wastes. The increased pressures may also cause a greater amount of the chlorine, chlorine dioxide and/or chlorine containing compounds to dissolve in the water containing the infectious or medical wastes.

It is believed that means for increasing the pressure on the surface of the water containing the infectious wastes in the contact chamber to greater than atmospheric would include (1) sizing and/or valving the exit or effluent outlet orifice for less flow than the entrance or influent orifice, (2) using some type of mechanical means such as a pump to put pressure on the contact chamber, and (3) elevating the effluent outlet line to an elevation above the contact chamber. It is believed that pressures in the range of about 1 to about 2 atmospheres are preferable to insure rapid and efficient treatment and yet be compatible with existing structures and construction techniques. Also, note that the pressure may vary due to operational factors.

It is believed that contact, detention or residence times in the contact chamber in the range of about 30 seconds to about 5 minutes are preferable. Note that these very short contact times are an unexpected result and advantage of the present invention. Longer detention times could be used, e.g., about 5 to about 15 minutes or longer, however, the costs of constructing the contact chamber would increase.

The infectious or medical wastes may be mixed, agitated, shredded, pulverized or ground with process equipment prior to being treated in the contact chamber. This agitation or shredding could be performed on the medical wastes in a slurry or in essentially its dry or natural state. Furthermore, solids-liquid separation may be accomplished with process equipment following the contact chamber.

The chlorine containing compounds produced and used by the method of the present invention are intended for use as a disinfectant to destroy bacteria, microbes, viruses and pathogens found in the infectious or medical wastes in order to make it safe for disposal, e.g., in a landfill.

Note it is believed that the organic acids mentioned in this specification may include lactic, citric, tartaric, malic, oxalic, glycolic and mandelic acids and/or other organic hydroxy acids and carboxylic acids.

---

Figure 1:
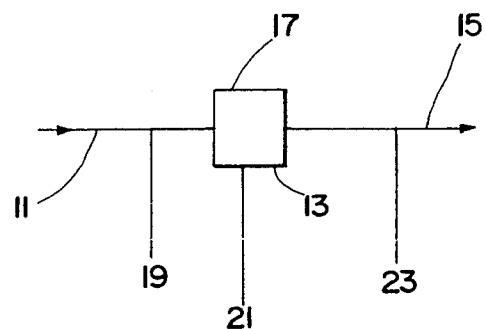
FIG. 1 is a schematic representation of one exemplary embodiment of the present invention.

Best Mode for Carrying Out the Invention

A more detailed description of the present invention follows on the form of chemical equations and examples.
The reactions utilized in the method of the present invention are believed to be as follows:

1. $$CH_3CH(OH)COOH + NaClO_2 \longrightarrow CH_2(OH)COONA + HClO_2$$
   (lactic acid)    (sodium chlorite)    (salt of lactic acid)    (chlorous acid)

It is beleived that citric, malic, tartaric, glycolic, oxalic, and mandelic acid may be substituted for lactic acid.

2. a. $$HClO_2 + \text{Non Fully Oxidized Organics or Inorganics} \longrightarrow HClO + \text{Oxidized Organics or Inorganics}$$
   (chlorous acid)      (Hypochlorus acid)

2. b. $$2HClO_2 \longrightarrow HClO + HClO_3$$
   (chlorous acid)    (Hypochlorus acid)    (chloric acid)

(This reaction occurs in absence of chloride ion)
This reaction 2.b. is not desirable, but it will occur simultaneously with reaction 3., but not necessarily at the same rate.

3. $$HClO + 2HClO_2 \longrightarrow 2ClO_2 + H_2O + HCl$$

(This reaction occurs in absence of chloride ion)

4. $$ClO_2 + \text{Non Fully Oxidized Organics or Inorganics} \longrightarrow HClO_2 + \text{Oxidized Organics or Inorganics}$$

Reaction 3. provides chloride ions, therefore the following reaction occurs:

5. $$HClO + Cl^- + H^+ \rightleftharpoons Cl_2 + H_2O$$

The Chlorine reaction with organics or Inorganics is generally thought to be primarily an Oxidation as follows:

| -continued |
| --- |
| Best Mode for Carrying Out the Invention |

6. 

The above reactions are carried out at a pH less than 7.

In practice, the reactants and reactions are produced by mixing bulk quantities of sodium chlorite and certain organic acids. Furthermore, it is believed that in the above reaction Number 1. that citric, malic, tartaric, glycolic, oxalic and mandelic acids may be substituted for the lactic acid to produce a salt of the organic acid and chlorous acid in an aqueous solution.

The above reaction Number 1. is accomplished by mixing the reactants together at atmospheric pressure in an aqueous solution with the water temperature being approximately 62 degrees F. (16.7 degrees C.) being in the range of about 60 degrees F. (15.6 degrees C.) to about 80 degrees F. (26.7 degrees C.). The higher temperatures nearing about 80 degrees F. (26.7 degrees C.) can be used if necessary to increase the reaction speed. Higher water temperatures may be feasible.

It may be feasible to use chlorine, ozone, chlorine gas and/or chlorine dioxide made by any method in conjunction with the present invention.

It should be noted that the aforementioned reactions result in a mixture of species of compounds which is believed to include chlorous acid, chloric acid, chlorine dioxide or chlorine; it is further believed that the powerful oxidation and/or disinfection nature and characteristics of the disinfectants of the present invention is due to a mixture of these compounds acting either jointly or singularly, or, acting as a mixture of these chemical substances.

The aqueous solutions containing the chlorine compounds which comprise the disinfectant are then injected, mixed with or contacted with the water containing the infectious or medical wastes in some type of container, conduit, pipe, chamber, vessel or other enclosed space or cavity so that the chlorine compounds become thoroughly mixed with the infectious wastes for sufficient time so that treatment and disinfection of the infectious wastes occurs.

It is believed that the above reactions produce aqueous solutions containing very high concentrations of chlorine dioxide ranging from generally about 4,000 ppm to about 80,000 ppm. Furthermore, the chlorine dioxide produced by the present invention appears to have more oxidizing and pathogen destroying power on a per unit basis than chlorine dioxide produced by other methods. Mixtures of about 4,000 ppm to about 6,000 ppm chlorine dioxide commonly occur in these solutions.

Turning to FIG. 1, one exemplary schematic embodiment for using the present invention to treat or disinfect infectious wastes is shown. At 11, the influent line, inlet line or conveyance means, e.g., a conveyor belt or batch loading means, carrying the infectious wastes to the contact chamber is shown with the contact chamber, agitation, or mixing vessel 13. Note that agitation in this chamber could be due to an impeller like device, an agitator similar to that used in an ordinary clothes washing machine or to a compartmentalized chamber, or other like means that could assure effective mixing of the wastes and disinfectant.

The effluent discharge line, outlet line or conveyance means is shown at 15. Note that the pressure of the contents of the mixing vessel may be greater than about one atmosphere and that the detention time may be about 30 seconds to about 5 minutes. However, the present invention would function, i.e., treat or disinfect, if the detention times were increased, e.g., in the range of about 5 minutes to about 15 minutes or longer. However, the costs of construction would increase.

It is believed that means for increasing the pressure on the surface of the water containing the medical wastes in the contact chamber to a pressure greater than atmospheric could include sizing and/or valving the exit or effluent outlet line, 15, so that it could carry less flow than the entrance or influent line, 11. Additionally, some type of mechanical means, e.g., a pump, could be used at, 17, to put pressure on the influent line or the contact chamber. Alternatively, the elevation of the effluent line with respect to the mixing vessel could be designed to cause a greater than atmospheric pressure to be exerted on the liquids contained therein. Note that the aqueous solution of chlorine containing compounds could alternatively be injected into the influent line, 11, either through the single line 19 or into the chamber, 13, through the single line 21; or, it might be possible to inject the aqueous solution of chlorine containing compounds through line 23 into the effluent line 15, if the effluent line were long enough to provide adequate detention time and acceptable mixing.

Figure 2:
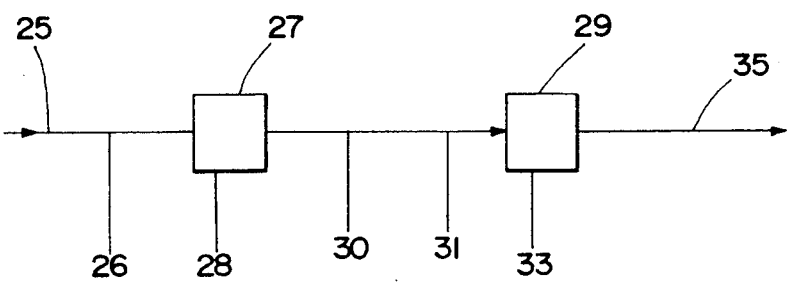
FIG. 2 is a schematic representation of a second exemplary embodiment using the present invention.

Turning to FIG. 2, a second exemplary schematic embodiment for using the present invention to treat or disinfect waters containing medical wastes is shown. In FIG. 2, there is shown at 25 the inlet line, conveyance or batch loading means containing or carrying the medical waste proceeding into an agitating, mixing or shredding device for mixing, agitating, grinding, pulverizing or shredding the medical waste at 27. Also shown therein are alternative water inlet lines at 26 and 28 wherein a liquid carrier agent could be mixed with the medical waste at the inlet line 25 or in the agitator or shredder itself at 28 in order to form a slurry. The slurry of water and medical wastes may be easier to agitate, mix, grind or shred than if the medical wastes were in an essentially natural or dry state. Alternatively, the medical waste could be ground or shredded in a dry state or essentially dry state and have a liquid or water carrier mixed with it at 30. Following the shredder, 27, the medical waste next travels to the mixing vessel, 29. The aqueous solutions containing the chlorine containing compounds could be contacted with or mixed with the medical waste at 31 or alternatively through the inlet line at 33 directly into the mixing vessel. The outlet line or means is shown at 35.

Figure 3:
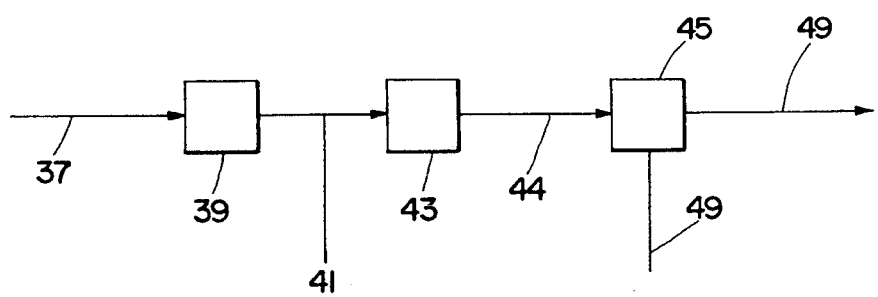
FIG. 3 is a schematic representation of a third exemplary embodiment using the present invention.

Turning to FIG. 3, therein is shown a third exemplary schematic for using the present invention wherein the inlet line, 37 is shown going to the shredder, 39, and thereafter to the mixing chamber, 43. At 41 is shown the inlet line for the aqueous solutions containing the chlorine containing compounds. Following the mixing chamber, 43, the medical wastes are conveyed by means 44 to a solids-liquid separating device, 45. The solids-liquid separator could, e.g., be a centrifuge, filter, screening or gravity separator, or the like, etc. Following the separator, 45, a liquid outlet line or conveyance means 47, is shown and a separate solid outlet line or conveyance means 49, is shown.

Figure 4:
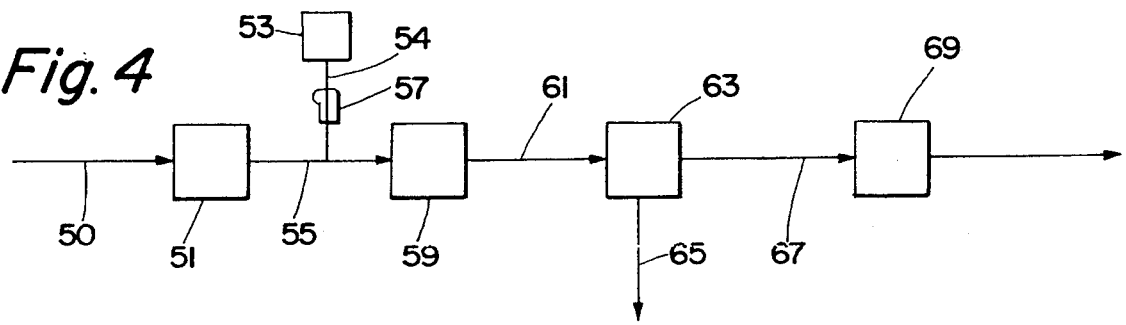
FIG. 4 is a schematic representation of a fourth exemplary embodiment using the present invention.

Turning to FIG. 4, therein is a shredder, 51, having an inlet line for the medical waste, 50, and an outlet line, 55. Furthermore, at 53 is shown a container for holding the aqueous solutions of chlorine containing compounds, from which chlorine containing solution is conveyed through line 54 due to a chemical feed pump, 57, into line 55, and thereafter travels into the mixing vessel, 59. Thereafter, the waste materials are transferred through line or conveyance means, 61, into the solids-liquids separator, 63. Thereafter, the liquids are transferred through line 65 to a holding tank for testing and thereafter final disposal. Solids leave the solids-liquids separator through line 67 traveling thereafter to a holding area, 69, whereafter they are transported to a proper disposal site, e.g., a landfill.

Figure 5:
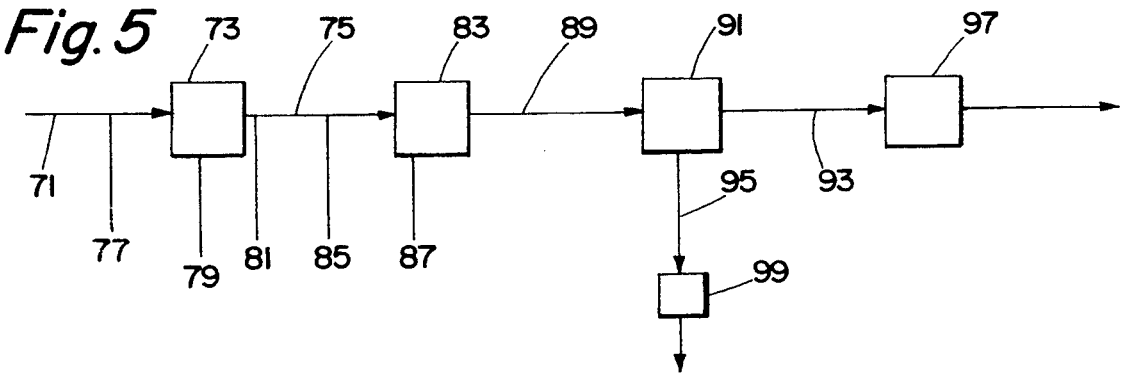
FIG. 5 is a schematic representation of a fifth exemplary embodiment using the present invention.

Turning to FIG. 5, a more detailed schematic for using the present invention is shown wherein an inlet line or conveyance means, 71, is shown leading to a shredding device, 73, having an outlet line, 75. Furthermore, at 77, 79, and 81 are shown alternative inlet lines for liquids to serve as the carrier or agent for transporting the medical waste. The materials next travel to the pressure treatment tank or vessel, 83, having alternative inlet lines 85 and 87 for receiving the aqueous solutions containing the chlorine containing compounds. At 89 is shown an outlet line or conveyance means leading into the solids-liquids separator, 91, having outlet lines or means, 93, for liquids which then travels to a liquids holding area, 97, and thereafter to a final disposal site. Furthermore, the solids-liquids separator has an outlet line or means, 95, for transporting solids whereafter the solids are moved to a solids holding area, 99, whereafter they are transported to a proper final disposal site.

Normally, the aqueous solution containing the chlorine containing substances would be injected into the mixing vessel or contact chamber, i.e., in FIG. 5, this would be shown at 83. Alternatively, the aqueous solutions of the chlorine containing compounds could be injected into the influent lines 75 to the mixing vessel in FIG. 5 prior to the contact chamber itself. Furthermore, mixing by hydraulic turbulence at or near the point of addition of the chlorine containing compounds to the water containing the medical wastes is possible if mechanical mixing is not used. Furthermore, it is possible to achieve mixing in the contact chamber by compartmentalizing the contact chamber.

Medical and/or infectious wastes in this specification comprise all liquid, solid, or semi-solid materials discarded, transferred, removed or wasted which are related to or concerned with physicians or their offices, hospitals, medical schools, medical research facilities, medical clinics or like facilities, or the practice of medicine. Medical and/or infectious wastes commonly comprise bed linens, syringes, swabs, excreta, blood, blood products, body fluids, bone, tissue, gloves, dressings and other objects which have come in contact with the above mentioned.

The actual construction, application and/or use of applicant's invention at the plant level could very well utilize a combination of the examples, Figures or parts thereof presented herein.

It should be understood that the teachings of this specification are given by way of example, illustration and explanation thereof and not by way of limitation because many changes in the invention may be effected without departing in any way from the scope and spirit of this invention as disclosed in the specification, drawings and claims contained herein.

I claim:

1. In a process for treating and disinfecting infectious wastes which includes introducing an aqueous solution into a chamber containing infectious wastes the improvement comprising the steps of:
   (a) introducing into the chamber containing said infectious wastes an aqueous solution prepared by mixing (1) an organic hydroxy acid or carboxylic acid and (2) an alkali metal or alkaline earth metal chlorite;
   (b) sealing the contents of said chamber from the atmosphere;
   (c) pressurizing the contents of said chamber to a pressure greater than atmospheric pressure; and,
   (d) detaining the contents of said chamber for a period of time of no more than 15 minutes whereby substantially all bacteria, microbes and other pathogenic organisms are destroyed in said infectious wastes.

2. The process of claim 1, further comprising shredding said infectious wastes.

3. The process of claim 1, further comprising mixing said infectious wastes.

4. The process of claim 1, further comprising detaining the contents of said chamber for a period of time of no more than 5 minutes.

5. In a process for treating and disinfecting infectious wastes which includes introducing an aqueous solution into a chamber containing infectious wastes, the improvement comprising the steps of:
   (a) introducing into the chamber containing said infectious wastes an aqueous solution prepared by mixing (1) lactic acid and (2) sodium chlorite;
   (b) sealing the contents of said chamber from the atmosphere;
   (c) pressurizing the contents of said chamber to a pressure greater than atmospheric pressure; and,
   (d) detaining the contents of said chamber for a period of time of no more than 15 minutes whereby substantially all bacteria, microbes and other pathogenic organisms are destroyed in said infectious wastes.

6. The process of claim 5, wherein the organic acid is citric acid.

7. The process of claim 5, wherein the organic acid is malic acid.

8. The process of claim 5, wherein the organic acid is tartaric acid.

9. The process of claim 5, wherein the organic acid is glycolic acid.

10. The process of claim 5, wherein the organic acid is mandelic acid.

11. The process of claim 5, wherein the organic acid is oxalic acid.

12. The process of claim 5, further comprising shredding said infectious wastes.

13. The process of claim 5, further comprising mixing said infectious wastes.

14. The process of claim 5, further comprising detaining the contents of said chamber for a period of time of no more than 5 minutes.

15. An apparatus for treating and disinfecting infectious wastes comprising:
   (a) a chamber;

(b) said chamber having an inlet means and an outlet means for infectious wastes;

(c) means containing an aqueous solution of (1) an organic hydroxy acid or carboxylic acid and (2) an alkali metal or alkaline earth metal chlorite;

(d) means for providing said aqueous solution to said chamber;

(e) said chamber being sized to provide a detention time of no more than 15 minutes for the infectious wastes;

(f) said chamber being sealed from the atmosphere; and, (g) said apparatus having pressurizing means for providing a pressure greater than one atmosphere on the contents of said chamber thereby effective to destroy substantially all bacteria, microbes and other pathogenic organisms in said infectious wastes.

16. The apparatus of claim 15, further comprising means for shredding.

17. The apparatus of claim 15, further comprising means for mixing.

18. The apparatus of claim 15, further comprising said chamber being sized to provide a detention time of no more than 5 minutes for the infectious waste.

19. The process of claim 1, wherein the contents of said chamber is under a pressure ranging from about one atmosphere to about two atmospheres.

20. The process of claim 5, wherein the contents of said chamber is under a pressure ranging from about one atmosphere to about two atmospheres.

21. The apparatus of claim 15, further comprising pressurizing means for providing a pressure on the contents of said chamber ranging from about one atmosphere to about two atmospheres.

* * * * *